United States Patent [19]
Yamaguchi et al.

[11] Patent Number: 5,954,783
[45] Date of Patent: Sep. 21, 1999

[54] ENGINE CONTROL SYSTEM USING COMBINATION OF FORWARD MODEL AND INVERSE MODEL

[75] Inventors: Masashi Yamaguchi; Yoko Fujime, both of Iwata, Japan

[73] Assignee: Yamaha Hatsudoki Kabushiki Kaisha, Shizuoka-ken, Japan

[21] Appl. No.: 08/949,838

[22] Filed: Oct. 14, 1997

[30] Foreign Application Priority Data

Oct. 14, 1996 [JP] Japan ................................. 8-271188

[51] Int. Cl.⁶ .................................................. F02D 41/04
[52] U.S. Cl. ......................... 701/106; 701/104; 701/109; 123/480; 123/675
[58] Field of Search ................................. 123/675, 682, 123/480, 492, 493; 701/104, 106, 109

[56] References Cited

U.S. PATENT DOCUMENTS

| | | | |
|---|---|---|---|
| 4,535,736 | 8/1985 | Taura et al. | 123/391 |
| 5,200,898 | 4/1993 | Yuhara et al. | 701/106 |
| 5,247,445 | 9/1993 | Miyano et al. | 701/106 |
| 5,524,599 | 6/1996 | Kong et al. | 701/106 |
| 5,568,799 | 10/1996 | Akazaki et al. | 123/492 |
| 5,642,722 | 7/1997 | Schumacher et al. | 123/480 |

FOREIGN PATENT DOCUMENTS 8-277742  10/1996  Japan.
9-88685   3/1997   Japan.

*Primary Examiner*—Tony M. Argenbright
*Assistant Examiner*—Mahmoud M. Gimie
*Attorney, Agent, or Firm*—Knobbe, Martens, Olson & Bear, LLP

[57] ABSTRACT

An engine control system includes an inverse model which includes a forward model and a feedback loop, wherein an actuating parameter, such as the quantity of fuel injected from a fuel injector, outputted from the forward model is used as a controlled variable, such as the air-fuel ratio in an exhaust system, inputted into the inverse model through the feedback loop. The forward model has preferably a learning function using condition-indicating factors such as engine speed and throttle angle. Accuracy of the inverse model is improved and appropriate engine control can be realized even during a transient state of the engine.

17 Claims, 13 Drawing Sheets

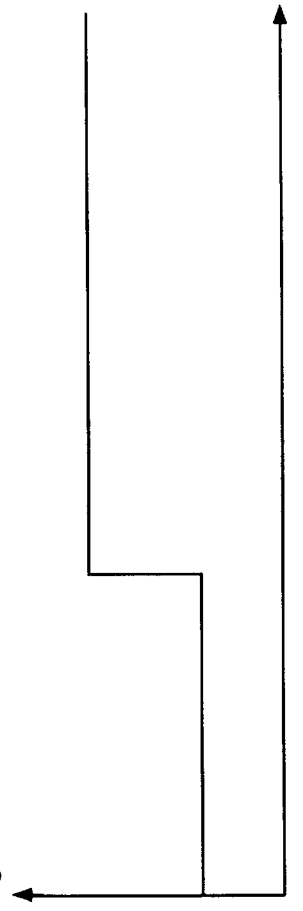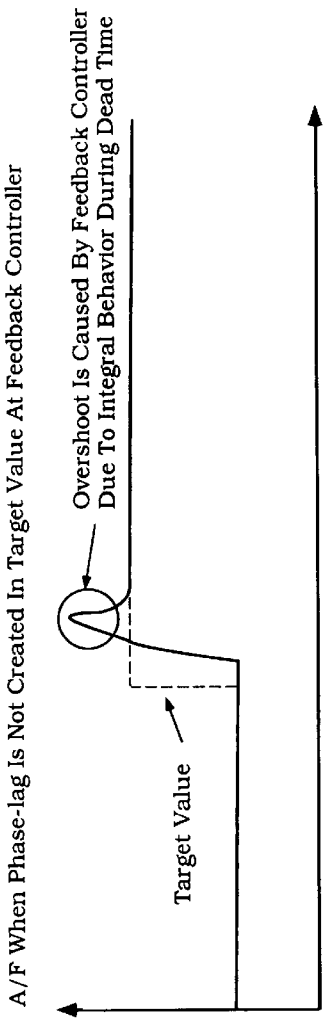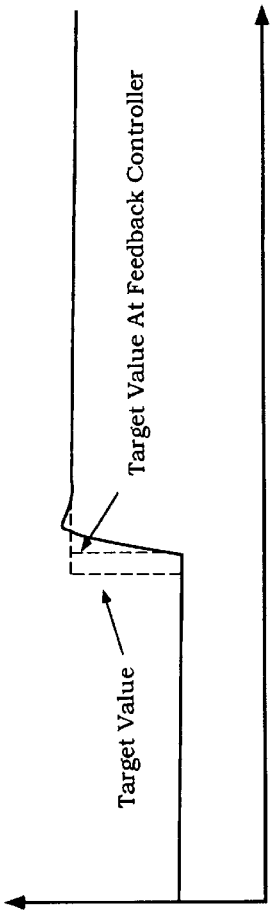

Throttle Angle

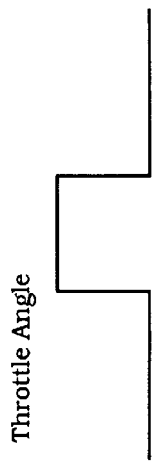

Figure 12a

Exhaust A/F when volumetric efficiency, fuel deposition rate, and time constant of evaporation are correct

Figure 12b

Exhaust A/F when volumetric efficiency is not correct

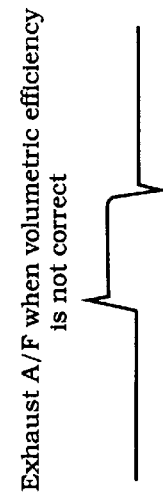

After learning at volumetric efficiency processing unit

Figure 12c

Exhaust A/F when fuel deposition rate and time constant of evaporation are not correct

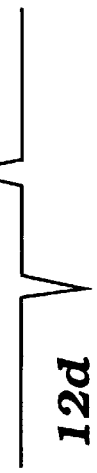

After learning at fuel deposition rate/time constant-of-evaporation processing unit

Figure 12d

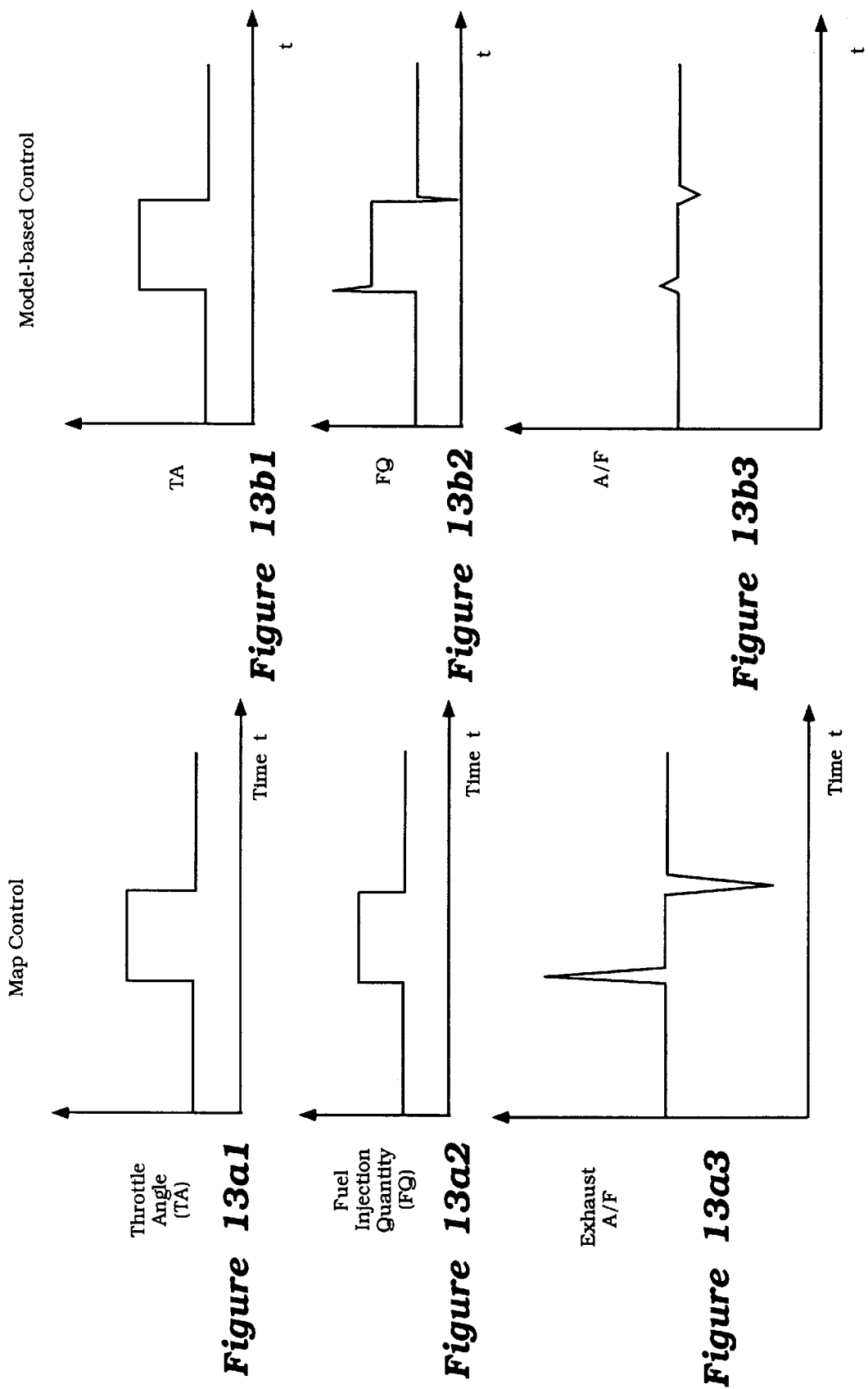

ENGINE CONTROL SYSTEM USING COMBINATION OF FORWARD MODEL AND INVERSE MODEL

BACKGROUND OF THE INVENTION

This invention relates to an engine control system, and particularly to that for controlling performance of engines installed in vehicles or vessels, in accordance with various state changes using an inverse model.

Heretofore, a control system using a map has been employed for controlling the air-fuel ratio of an electrically controlled engine, for example. The map is made by collecting data related to a fuel-injection quantity at a certain engine speed and throttle angle, and storing the data in a memory. In actual use, an appropriate air-fuel ratio is determined by detecting an engine speed and a throttle angle, inputting the detected data into the map, determining a fuel-injection quantity based on the map, calculating a compensation most suitable for the operational conditions at the moment or determining the compensation using another map, and inputting the compensation as an actuating value into a drive apparatus system.

However, although an appropriate air-fuel ratio can be obtained by using the control system using a map if operational conditions are normal (i.e., a stable state), it is impossible to conduct appropriate air-fuel ratio control if operational conditions are transient (i.e., a transient state), wherein a throttle angle is changed due to acceleration or deceleration. In the above, after a throttle angle is changed, the change is detected, thereby controlling the air-fuel ratio, and thus, a controlled variable cannot appropriately be determined in accordance with the air or fuel flow. Thus, the control system using a map does not work when the operational state is transient.

In addition, in an engine control system using a feedback system, a controlled variable (control value, e.g., the air-fuel ratio) actually outputted from the engine is fed back to a controlling system, and an actuating parameter (operation value, i.e., fuel injection quantity) of the engine is determined simply based on the actually measured air-fuel ratio and a target air-fuel ratio, thereby constituting a feedback loop having an inverse model-like function.

However, because there is a dead time which is the time for the injected fuel to travel from the fuel injector into a cylinder, a feedback approach using a control value actually outputted from the engine cannot keep up with a change during a transient state of the engine. That is, during a transient state of the engine, a feedback gain cannot be large, resulting in, for example, that an appropriate actuating value cannot be obtained immediately after a throttle valve opens or closes, i.e., it is difficult to track a change during a transient state of the engine (poor transient response). In addition, the engine is easily influenced by environmental changes, and the engine characteristics deteriorate with time. Thus, a discrepancy occurs in the outputted actuating values as a result of environmental changes and eventual engine deterioration. In other words, it is very difficult to accurately model the engine for inverse model control.

Further, there is a great demand in the market for accurate control over the air-fuel ratio even during a transient state, in response to the recent trend of tightening exhaust gas regulations.

An objective of the present invention is to provide an engine control system which is constituted by accurately modeling an engine to allow for tracking changes during a transient state, thereby solving the above problems and satisfying market requirements.

SUMMARY OF THE INVENTION

One important aspect of the present invention attaining the above objective is to provide an engine control system for controlling performance of an engine, comprising: an inverse model unit having input and output sides, for outputting an actuating parameter when receiving a controlled variable, comprising: a forward model unit having input and output sides, for outputting an estimated controlled variable when receiving at least one condition-indicating factor outputted from the engine, said at least one condition-indicating factor indicating conditions of the engine, said forward model unit being constituted by modeling a relationship between the controlled variable and the at least one condition-indicating factor; a feedback control unit having input and output sides, for outputting an actuating parameter when receiving and comparing a target value and the estimated controlled variable from said forward model unit, the output side of said feedback control unit being connected to the input side of said forward model unit; and an output circuit for outputting the actuating parameter, which is outputted from said feedback control unit to said forward model unit, from said inverse model unit for controlling the engine.

According to the invention, by using the controlled variable outputted from the forward model as an actuating parameter inputted into the inverse model, accuracy of the inverse model control is highly improved, thereby allowing for appropriate engine control even during a transient state of the engine. In the above, the actuating parameter may be one or more, and the controlled variable may be one or more, depending on how the engine control is performed.

When learning function is used in the forward model, response characteristics in response to changes in the environment, changes with time, and changes in the state are highly improved.

Further, when at least one of a fuzzy neural circuit network, neural circuit network, or CMAC is used in the learning function, a subject having highly non-linear behavior such as behavior of air flow or fuel deposition can be modeled with high accuracy.

When the learning is conducted using physical coefficients other than the controlled variable outputted from the forward model, the forward model can establish a modeled network using various factors.

When an initial value of teacher data used in the learning function is predetermined, given appropriate data such as those obtained through experiments can be used as the initial value, thereby simplifying learning process and increasing efficiency of learning.

When the forward model is composed of an air flow forward model and a fuel deposition forward model, modeling can be easier and more accurate (i.e., good response characteristics). In the above, when the air flow forward model uses volumetric efficiency of the engine as a parameter, and a formulation model is used to determine the volumetric efficiency, response characteristics can be improved since performing cycles can be very short, no air filter is required, and a sensing system can be highly simplified.

When the forward model is designed to be a first-order lag system, even if the controlled subject of the engine has dead time such as a time of fuel traveling from the injector to the inside of the cylinder, a large feedback gain in the forward model can be used, thereby allowing for accurate feedback control.

When the target value and the actual value outputted from the engine are compared in order to compensate for the actuating parameter outputted from the inverse model, i.e., the result of the comparison is fed back to the input side of the engine (the output side of the inverse model) through a second feedback loop, control can be more accurate.

In the above, when the phase of the target value to be inputted in the second feedback loop is shifted backward, an integral error created due to the dead time of the engine control can significantly be eliminated.

The above system can be adapted to an engine control method for reliable control over the controlled variable such as the air-fuel ratio can be achieved, and engine output can be maximized.

BRIEF DESCRIPTION OF THE DRAWINGS

FIG. 3 is a schematic diagram showing the behavioral characteristics of the target value (A/F). FIG. 3a shows the target value (A/F), FIG. 3b shows behavior of value A/F when a phase-lag is not created in the target value at the feedback controller, and FIG. 3c shows behavior of value A/F when a phase-lag is created in the target value at the feedback controller.

FIG. 12 shows examples illustrating the relationship between the throttle angle and the air-fuel ratio (the throttle angle is shown in FIG. 12a) when the volumetric efficiency is not corrected (FIG. 12c), when the fuel deposition rate and the coefficient of evaporation are not corrected (FIG. 12d), and when the volumetric efficiency, the fuel deposition rate and the coefficient of evaporation are corrected due to learning (FIGS. 12b, 12c, and 12d).

FIG. 13 is a schematic diagram showing behavior of each of the throttle angle, the fuel injection quantity, and the air-fuel ratio of exhaust gas when map control is conducted (FIGS. 13a1, 13a2, and 13a3, respectively) and when model-based control is conducted (FIGS. 13b1, 13b2, and 13b3, respectively), according to the present invention.

DETAILED DESCRIPTION OF THE PREFERRED EMBODIMENT

The engine control system of the present invention will be explained further with reference to an embodiment. In the embodiment, the subject to be controlled is an engine installed in vehicles or vessels, and the state of the subject is a driving state. However, in the state-control system of the present invention, no restriction is imposed on the type of machine to be controlled, and as with the engine, a robot used in machine tools, a motor used in electrically-driven vehicles, or the like can be controlled by adopting the state-control system based on the same principle as in the engine.

Engine Control System

Figure 1:
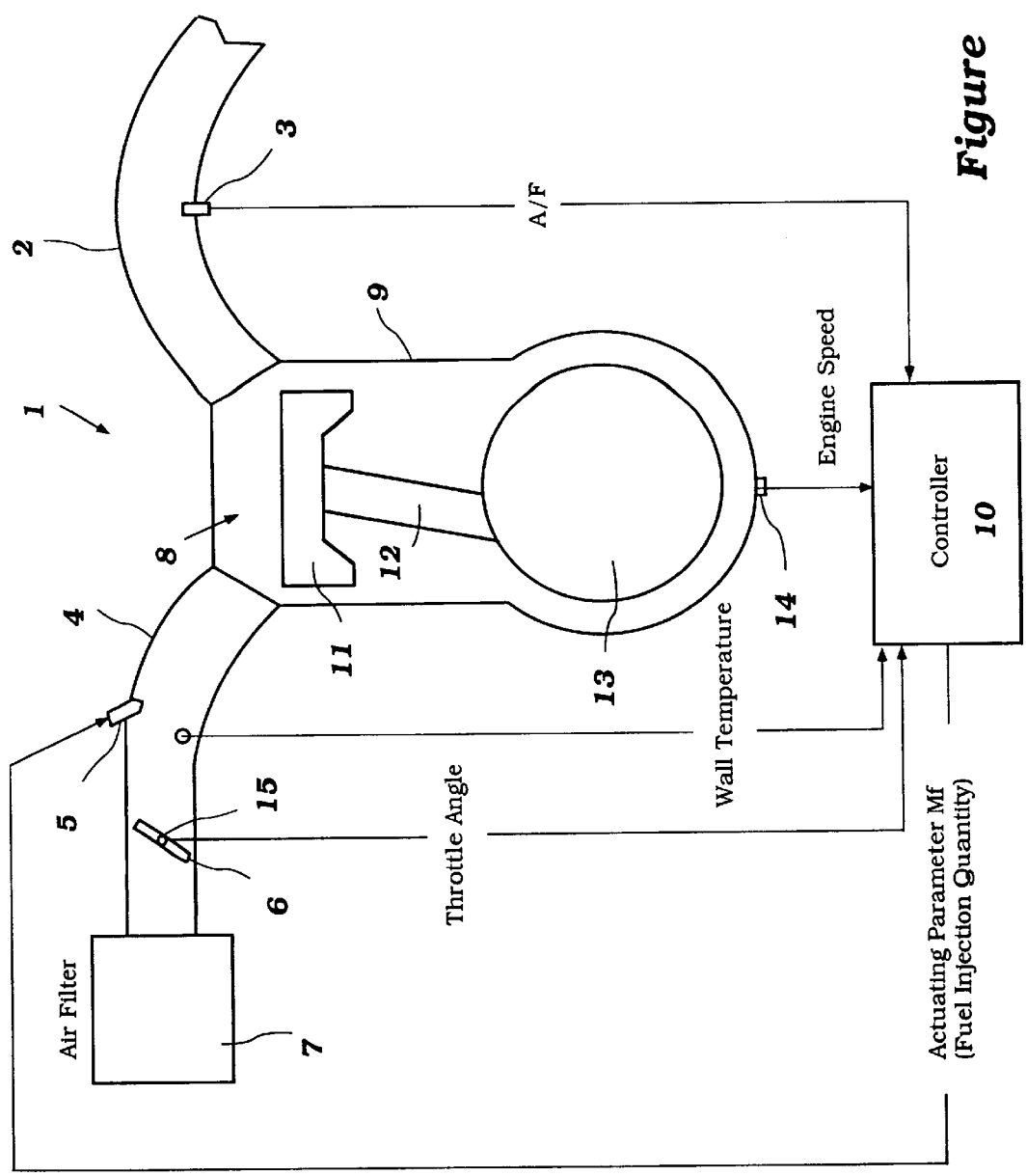
FIG. 1 shows a diagram of an engine control system installed in vehicles or vessels, wherein the relationship between an engine and a controller for operating an engine control system is illustrated, according to the present invention.

FIG. 1 shows a diagram of an engine control system installed in vehicles or vessels, wherein the relationship between an engine 1 and a controller 10 for operating an engine control system is illustrated. This system is for controlling air-fuel ratio A/F of the engine 1 at a desired value.

In a cylinder 9 of the engine 1, a piston 11 is placed in a reciprocally-movable way. The piston 11 is connected to a crank shaft 13 via a connecting rod 12, and the crank shaft 13 rotates as the piston 11 reciprocates. The engine 1 is provided with a sensor 14 which transmits an engine r.p.m. (signal n) to a controller 10. In a combustion chamber 8 formed in the cylinder 9 of the engine 1, an exhaust pipe 2 and an intake pipe 4, which are communicated to each other, are formed. In the exhaust pipe 2, an oxygen sensor 3 is provided which transmits a signal of the actual control value E (reciprocal number F/A of air-fuel ratio A/F) to the controller 10. Air is sucked into the intake pipe 4 through an air filter 7. A throttle 6 is provided in the intake pipe 4. The intake of air is controlled by the throttle 6, and the opening of the throttle 6 is sensed by a throttle-opening sensor 15 which transmits a signal of the angle (signal α) to the controller 10. An injector 5, which injects fuel, is provided in the intake pipe 4 downstream of the throttle 6. In addition, in the intake pipe 4, a temperature sensor for sensing the wall temperature is provided. The controller 10 receives the signal α of the throttle angle, the signal n of the engine r.p.m's., and the actual control value E, and based on the above input information, the controller 10 determines and outputs a fuel injection actuating value Mf (i.e., fuel injection quantity) to the fuel injector 5.

Figure 2:
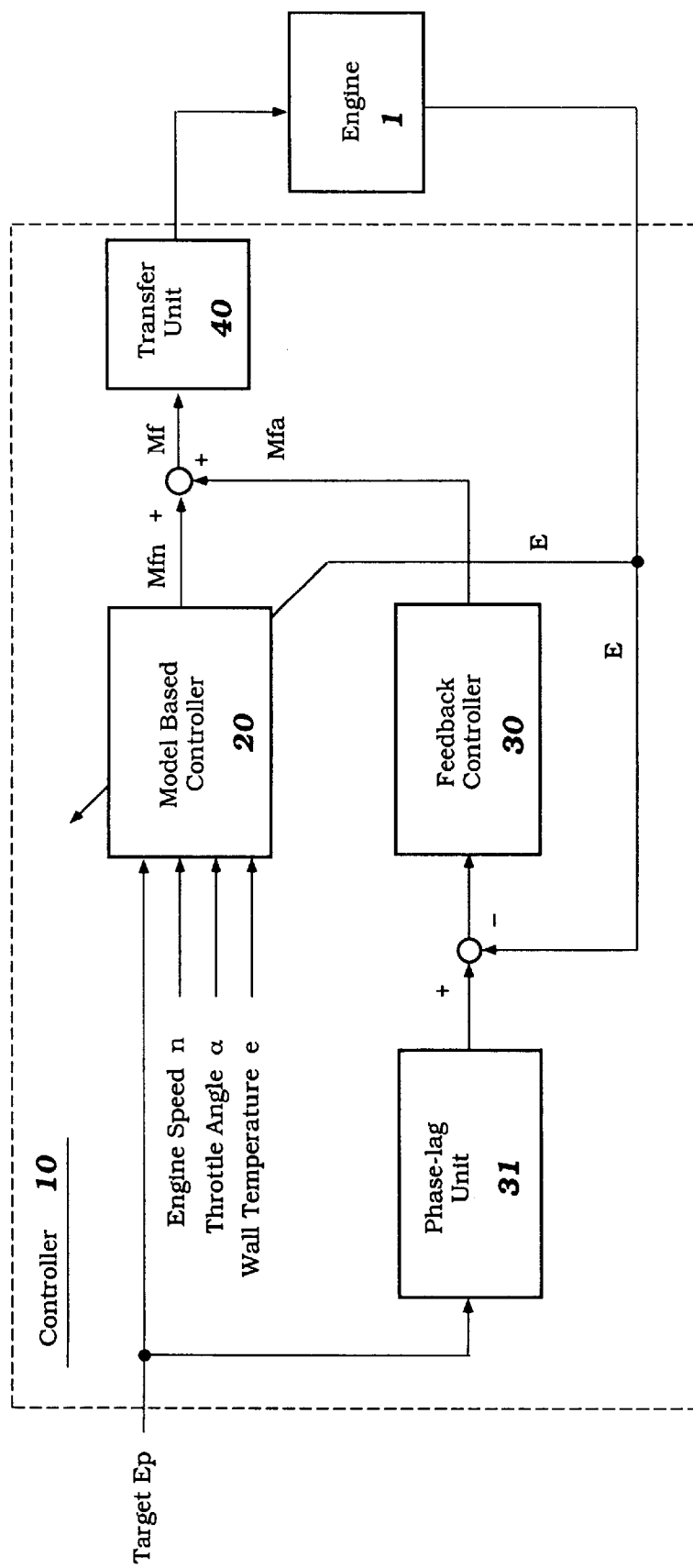
FIG. 2 shows a block diagram of control operated by the controller according to the present invention.

FIG. 2 shows a block diagram of control operated by the controller 10. The controller 10 comprises a model-based controller 20, an engine 1, and a feedback loop comprising a feedback controller 30 (this loop is referred to as "second feedback loop", and for convenience, a first feedback loop will be explained later).

The model-based controller 20 determines a basic operation value Mfn based on the information including an actual control value E, a target control value Ep, an engine speed signal n, a throttle angle signal α, and an intake pipe wall temperature e.

The feedback controller 30 in the second feedback loop determines a compensation Mfa for the basic operation value Mfn which has been determined by the model-based controller 20, upon comparing the actual control value E and the target control value Ep after receiving a feedback of the actual control value E from the engine 1. The basic operation value Mfn outputted from the model-based controller 20 and the compensation Mfa outputted from the feedback controller 30 are summed, and inputted into a transfer unit 40 which converts the summed value into a fuel injection cycle, and outputs it as an operation value Mf. The operation value Mf is inputted from the controller 10 to the engine 1.

In this embodiment, a phase-lag unit 31 is provided upstream of the feedback controller 30. The phase-lag unit 31 creates a phase-lag in the target value Ep to a degree corresponding to the dead time that is the time from fuel in the engine 1 being injected into the engine by the fuel injector 5, until entering the cylinder 8, thereby minimizing overshoot occurring due to the dead time. FIG. 3 is a schematic diagram showing the above characteristics. FIG. 3a shows the target value (A/F), FIG. 3b shows behavior of value A/F when a phase-lag is not created in the target value at the feedback controller, and FIG. 3c shows behavior of value A/F when a phase-lag is created in the target value at the feedback controller. As shown in FIG. 3b, without the phase-lag, overshoot is caused by the feedback controller due to the integral behavior during the dead time. In contrast, when the phase-lag is created as shown in FIG. 3c, the integral behavior is highly eliminated, thereby preventing overshoot.

Model-Based Controller

Hereinafter, the structures of the model-based controller 20 of FIG. 2 will be explained in detail with reference to FIGS. 4 to 11.

Figure 4:
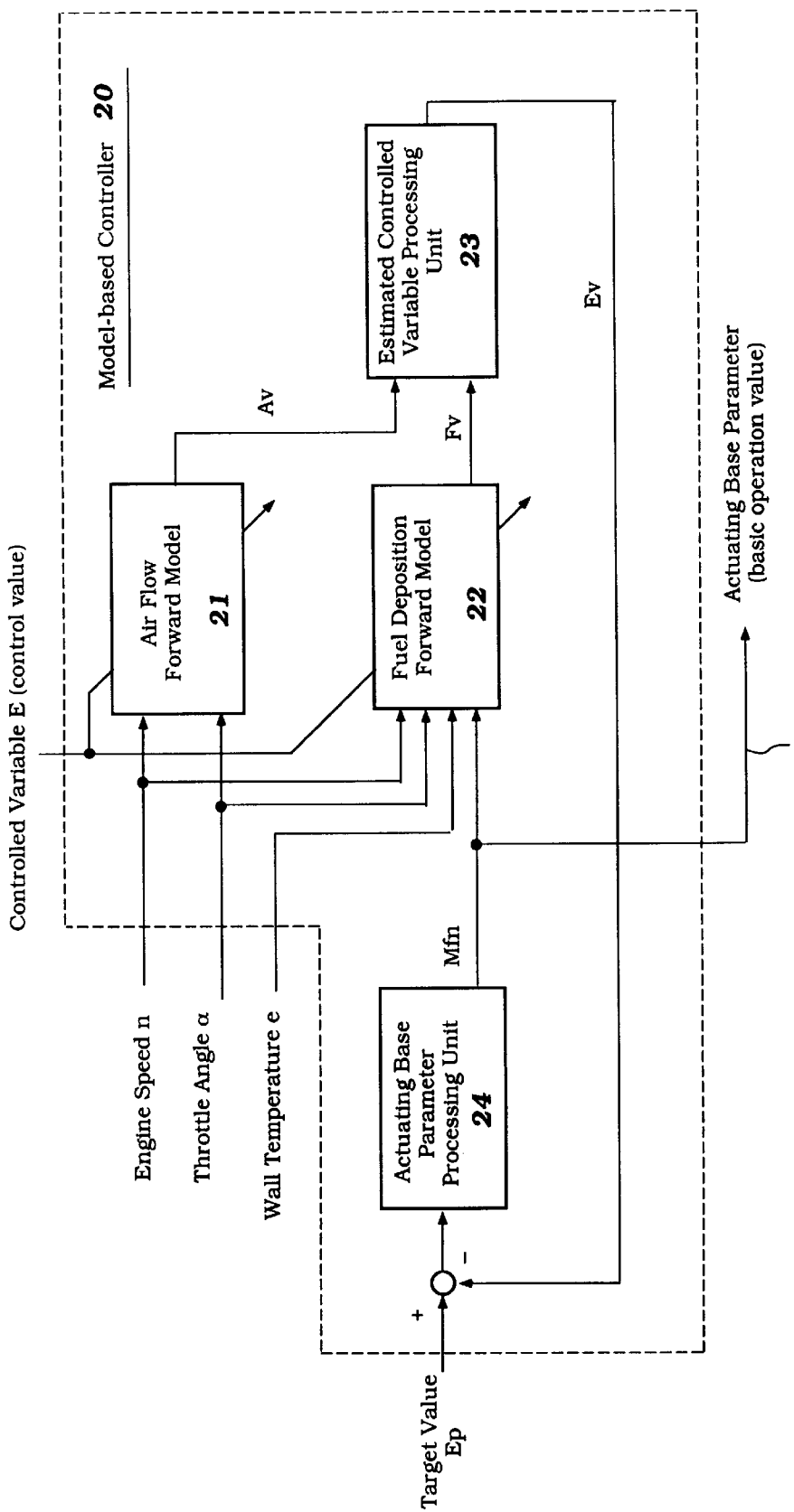
FIG. 4 is a schematic block diagram showing the structures of the model-based controller illustrated in FIG. 2.

FIG. 4 is a schematic block diagram showing the structures of the model-based controller 20 illustrated in FIG. 2. The model-based controller 20 comprises an air flow forward model 21 which is constituted by modeling air flow behavior in the intake pipe 4, a fuel deposition forward model 22 which is constituted by modeling deposition behavior of fuel injected by the fuel injector 5, and an estimated control value processing unit 23 which calculates an estimated control value Ev (reciprocal number of estimated air-fuel ratio, F/A) based on an estimated air flow Av outputted from the air flow forward model 21 and an estimated fuel quantity Fv outputted from the fuel deposition forward model 22.

In addition, the model-based controller 20 comprises a feedback loop wherein the estimated control value Ev outputted from the estimated control value processing unit 23 is fed back to a actuating base processing unit 24 (functioning as a feedback control unit) (for convenience, referred to as "first feedback loop"). At the actuating base parameter processing unit 24, the estimated control value Ev and the target control value Ep are inputted to calculate the basic operation value Mfn (basic fuel injection quantity) for the fuel injector 5 of the engine 1. This basic operation value Mfn is also inputted into the fuel deposition forward model 22 while outputted from the model-based controller 20. The basic operation value Mfn is outputted through an output circuit 50 for controlling the engine 1.

As described above, the model-based controller 20 is constituted by a forward model of the engine 1, which comprises the air flow forward model 21, the fuel deposition forward model 22, and the estimated control value processing unit 23, and an inverse model of the engine 1, which performs feedback of the estimated control value Ev outputted from the forward model of the engine 1, using the first feedback loop comprising the fuel deposition forward model 22, the estimated control value processing unit 23, and the actuating base parameter processing unit 24, thereby outputting the basic operation value Mfn upon receiving the estimated control value Ev and the target control value Ep at the actuating base parameter processing unit 24.

In the above, the reason that the reciprocal number F/A of the air-fuel ratio is used as the estimated control value Ev at the model-based controller 20 in order to control the air-fuel ratio is as follows: When feedback control is conducted using a parameter, as a control value, having a denominator that is an operation value such as the air-fuel ratio A/F (i.e., fuel injection quantity), if the control value is greater than the operation value, i.e., the air-fuel ratio is high, the fuel injection quantity used as the operation value should be increased; however, if the air-fuel ratio (A/F) is used in feedback control, the operation value processing unit will act to decrease the operation value because the control value is greater than the target value. This drawback can be omitted if the reciprocal number (F/A) of the air-fuel ratio is used in the feedback control. For the same reason, the actual control value E is the reciprocal number (F/A) of the air-fuel ratio which is fed back to the feedback controller 30.

Fuel Deposition Forward Model

Figure 5:
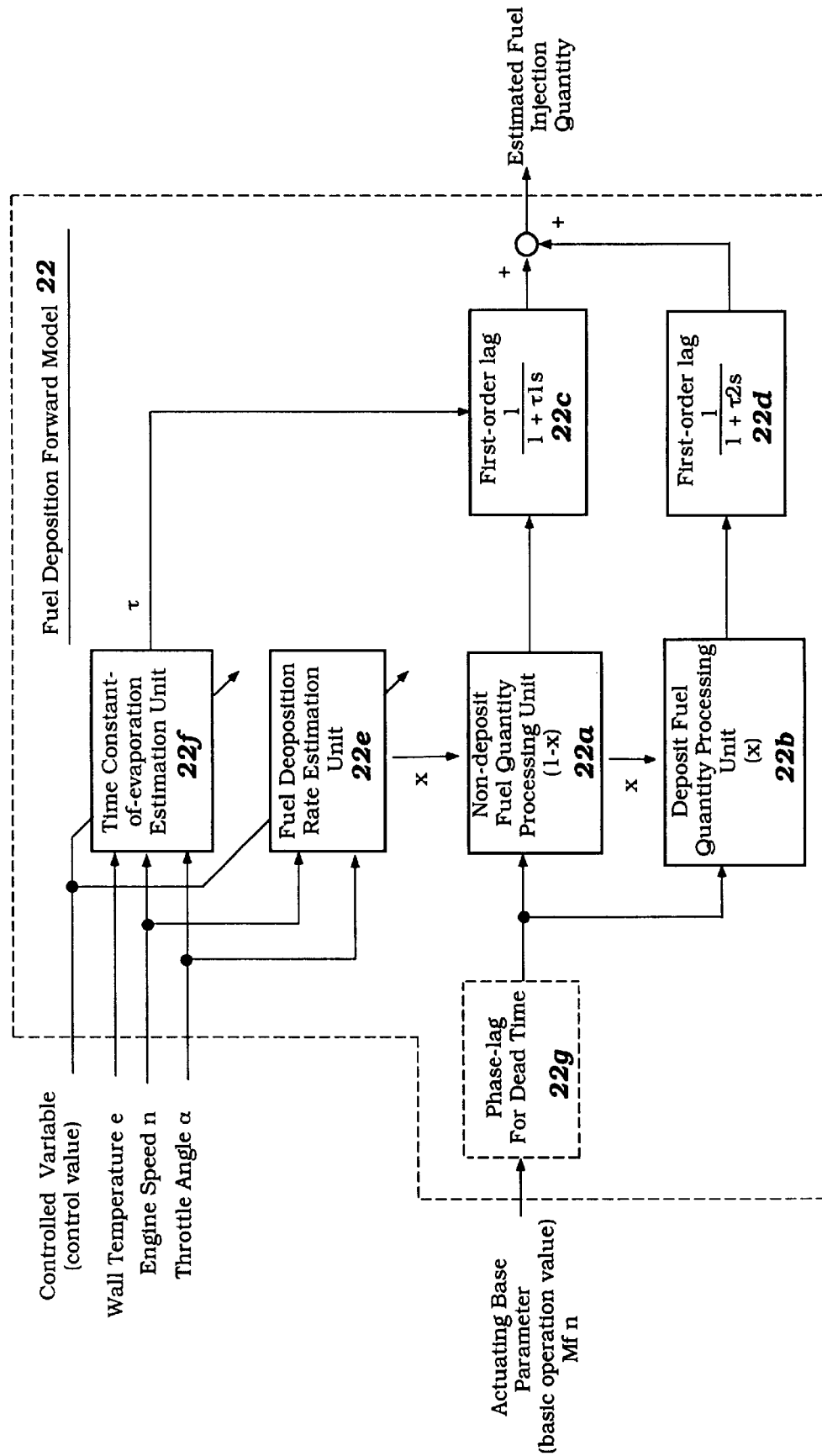
FIG. 5 is a schematic block diagram showing the structures of the fuel deposition forward model illustrated in FIG. 4.

FIG. 5 is a schematic block diagram showing the structures of the fuel deposition forward model 22 of FIG. 4. This fuel deposition forward model 22 is constituted by modeling the behavior of fuel injected from the fuel injector 5 as described above.

The fuel deposition forward model 22 comprises a non-deposit fuel quantity processing unit 22a, a deposit fuel processing unit 22b, a first-order lag units 22c, 22d, a fuel deposition rate estimation unit 22e, and a time constant-of-evaporation estimation unit 22f. The fuel deposition forward model 22 estimates a quantity Fv of fuel actually introduced into the cylinder 8 based on the basic operation value Mfn (basic fuel injection quantity) inputted from the aforesaid actuating base parameter processing unit 24 of FIG. 4.

The fuel deposition rate estimation unit 22e receives the engine speed signal n and the throttle angle signal $\alpha$ as well as the controlled variable E (for forming teacher data), and based on the above information, estimates the ratio X (hereinafter referred to as "fuel deposition ratio X") of the fuel deposited on a wall of the intake pipe 4 to the fuel injected by the fuel injector 5.

The time constant-of-evaporation estimation unit 22f receives the engine speed signal n, the throttle angle signal $\alpha$, and the intake pipe wall temperature e (the temperature of engine water) as well as the controlled variable E (for forming teacher data), and based on the above information, estimates the fuel quantity entering directly the cylinder 8 from the fuel injector 5 at the basic fuel injection quantity Mfn (basic operation value) inputted from the actuating base parameter processing unit 24.

The deposit fuel processing unit 22b estimates the fuel quantity entering the cylinder 8 after once being deposited on a wall at the basic fuel injection quantity Mfn (basic operation value) inputted from the basic operation value processing unit 24, based on the fuel deposition rate X outputted from the fuel deposition ratio estimation unit 22e.

The fuel quantity obtained by the non-deposit fuel processing unit 22a and the deposit fuel processing unit 22b are approximated to a first-order lag system based on the time constants of evaporation $\tau 1$ and $\tau 2$ obtained from the time constant-of-evaporation estimation unit 22f, and then summed to output it as the estimated fuel quantity Fv from the fuel deposition forward model 22.

In the above, when modeling the behavior of fuel injected by the fuel injector 5 of the engine 1, a phase-lag unit for dead time 22g is normally necessary, as indicated in FIG. 5 with the broken line, to cause a phase lag to a degree corresponding to the dead time, by taking into consideration the dead time which is a time for the injected fuel to move from the fuel injector device 5 to the cylinder 8. However, in this embodiment, by causing a phase-lag in the fuel deposition forward model to a degree corresponding to the dead time, the need of the phase-lag unit for dead time 22g can be eliminated. Accordingly, the fuel deposition forward model 22 becomes a simple first-order lag system, and thus, when performing feedback control using output of the fuel deposition forward model 22, a large feedback gain can be used, thereby constituting an accurate inverse model which provides appropriate basic operation value even during a transient state.

Fuzzy Neural Network For Fuel Deposition Rate X

The structures of the fuel deposition rate estimation unit 22e will be explained further with reference to FIGS. 6 and 7.

Because the fuel deposition rate X cannot be modeled using equations, the fuel deposition rate X is modeled using a fuzzy neural network at the fuel deposition rate estimation unit 22e.

Figure 6:
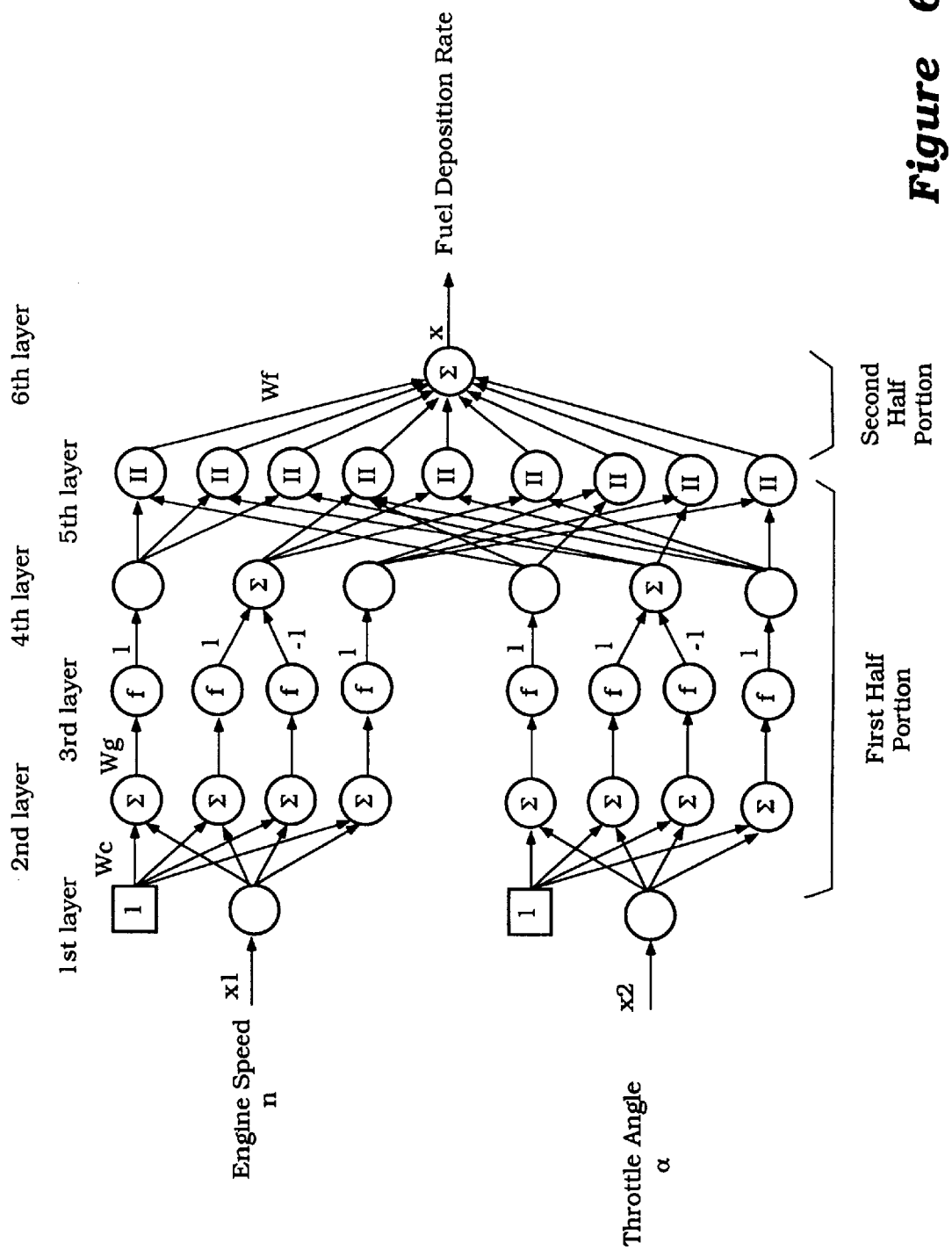
FIG. 6 is a schematic diagram showing a fuzzy neural network for determining the fuel deposition rate X, which is used in the fuel deposition rate estimation unit illustrated in FIG. 5.
Figure 7:
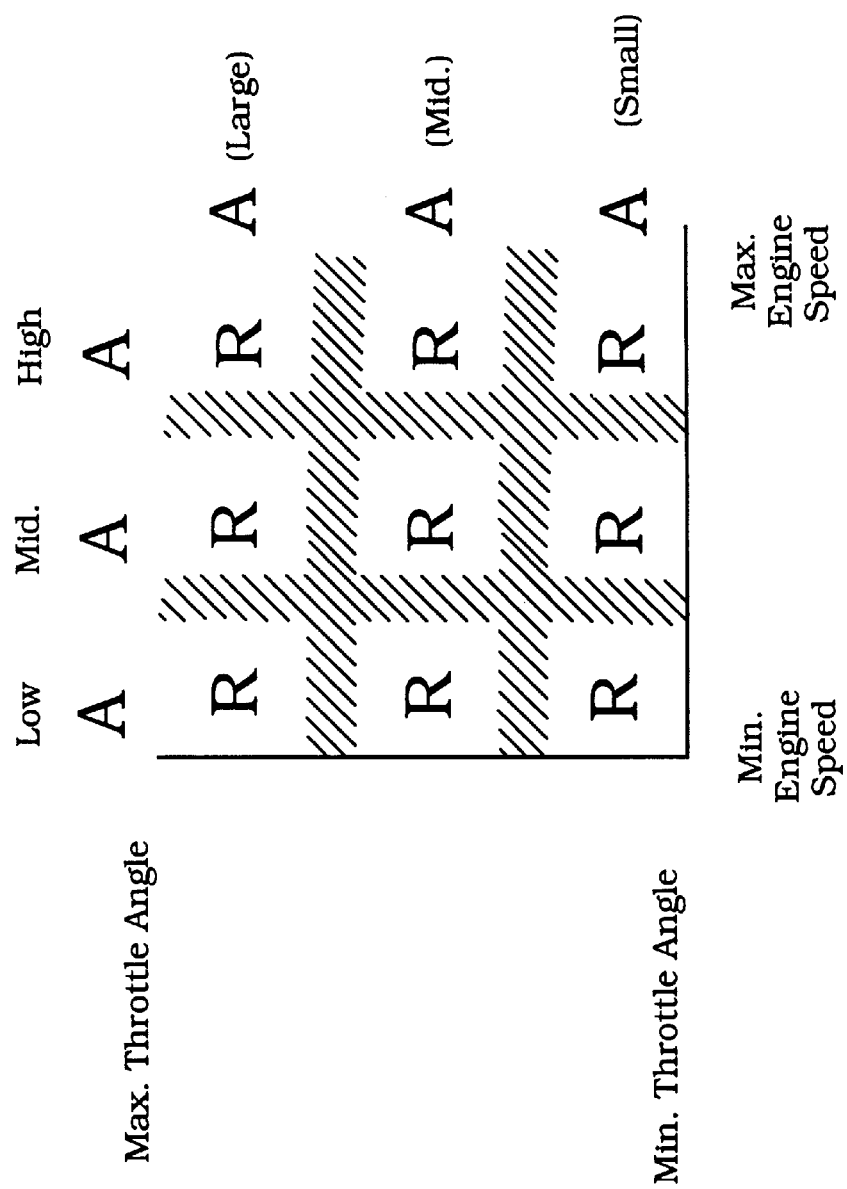
FIG. 7 is a schematic diagram showing the rule in the form of a map used in the fuzzy neural network illustrated in FIG. 6, wherein the vertical axis shows conditions for the throttle angle, and the horizontal axis shows conditions for the engine speed, and nine segments (regions) two-dimensionally divided by each condition shows results R1–R9.

FIG. 6 is a schematic diagram showing a fuzzy neural network for determining the fuel deposition rate X. As shown in this figure, this fuzzy neural network comprises a hierarchical fuzzy neural network composed of six layers, wherein layers from a first layer through a fourth layer constitute a first half portion, and layers from a fifth layer to a sixth layer constitute a second half portion. At the first half portion, the engine speed and throttle angle inputted thereinto are subjected to fuzzy inference processing to determine to what degree they conform to given rules, and at the second half portion, the fuel deposition rate X is determined based on the outcomes from the first half portion by weighting the outcomes.

In this embodiment, the above rule comprises: three conditions for each input information, A11, A21, and A31 for the engine speed, and A12, A22, and A32 for the throttle angle; and nine results R1–R9 corresponding to the conditions. FIG. 7 is a schematic diagram showing the rule in the form of a map. The vertical axis shows conditions A12, A22, and A32 for the throttle angle, and the horizontal axis shows conditions A11, A21, and A31 for the engine speed. Nine segments (regions) two-dimensionally divided by each condition for the throttle angle and each condition for the engine speed, show results R1–R9.

In the above, conditions A11, A21, and A31 denote that the engine speed is in a "low range", "intermediate range", and "high range", respectively. Condition A12, A22, and A32 denote that the throttle opening is "small", "intermediate", and "large", respectively. Results R1–R9 denote the fuel deposition rate Xs' corresponding to the engine speeds and the throttle angles. According to the above rules and conditions, nine principles can be created, e.g., "when the engine speed is in a high range, and the throttle opening is intermediate, the fuel deposition rate is 50%", and "when the engine speed is in a low range, and the throttle opening is small, the fuel deposition rate is 70%."

The layers from the first layer through the fourth layer, constituting the first half portion, is divided into two processing processes, one for the engine speed, and the other for the throttle angle. At the first layer, each of the engine speed signal n and the throttle angle α is inputted as input signal $xi$ (i=1 or 2), and at the second layer through the fourth layer, contribution aij of each input signal xi is determined for each of conditions A11, A21, A31, A12, A22, and A32. That is, contribution aij can be calculated using a sigmoid equation f(xi) indicated below as equation (1):

$$\text{Contribution } aij = f(xi) = 1/(1+exp(-wg(xi+wc))) \quad (1)$$

In the above equation, wg and wc are coefficients related to the inclination and the central value of the sigmoid equation, respectively.

Based on the sigmoid equation, after contribution aij of each input signal xi (engine speed signal n and throttle angle α) is determined for each of conditions A11, A21, A31, A12, A22, and A32 at the fourth layer, conformity $\mu i$ is determined at the fifth layer, based on contribution aij, for each of nine results R1–R9 regarding the inputted engine speed signal and throttle angle, using equation (2). Further, conformity $\mu i$ (i=1–9) is normalized to obtain a normalized conformity using equation (3). At the sixth layer, the fuel deposition rate x is determined by using a weighted mean of the normalized conformity for each result obtained by equation (3) and each output fi of fuzzy rules (i.e., output corresponding to each of results R1–R9), using equation (4).

$$\text{Conformity } \mu i = \prod_j jaij \quad (2)$$

$$\text{Normalized Conformity } \mu' i = \mu i \Big/ \sum_k \mu k \quad (3)$$

$$\text{Fuel Deposition Rate } x = \sum_i \mu' ifi \quad (4)$$

The fuzzy neural network indicated in FIG. 6 is simply one example, and the engine speed or the throttle angle can be divided into more detailed conditions, i.e., more than nine results, thereby determining the fuel deposition x accordingly.

In the above, the deposit fuel estimation unit 22e has a learning function. Using the learning function, in the beginning, the unit undergoes the learning of the fuzzy neural network by correcting each of parameters Wc, Wg, and Wf (coupling coefficients indicating output fis' of the fuzzy rules) in such a way that the difference between the experimentally obtained fuel deposition rate and the fuel deposition rate x outputted from the fuzzy neural network is minimized. Thereafter, teacher data are renovated based on comparison between the actual control value E (F/A) obtained by the oxygen sensor 3 and the target Ep of operation values during a transient state of the engine, after receiving the data. The unit then undergoes the learning of the fuzzy neural network by correcting each of parameters Wc, Wg, and Wf in such a way that the discrepancy between the actual operation value E and the target value Ep is minimized, in accordance with the relationship between the fuel deposition rate and the operation value E, i.e., "if the fuel deposition rate x increases when the throttle opens in steps, the actual operation value E (F/A) increases". For example, if the actual operation value E is larger than the target operation value Ep when the throttle opens in steps, it is determined that the estimated fuel quantity Fv outputted from the fuel deposition forward model 22 is too high, accordingly renovating coefficients Wc and Wg of the sigmoid equation, and weighted mean Wf in such a way that the fuel deposition rate x obtained from the rule for the inputted engine speed and throttle angle is minimized. FIG. 12 shows examples illustrating the relationship between the throttle angle and the air-fuel ratio when the fuel deposition rate and the coefficient of evaporation are not corrected and when the fuel deposition rate and the coefficient of evaporation are corrected due to learning (FIGS. 12b and 12d). FIG. 12 also shows the behavior of the volumetric efficiency (FIGS. 12b and 12c).

Fuzzy Neural Network for Time Constant τ of evaporation

The structures of the time constant-of-evaporation estimation unit 22f will be next explained with reference to FIG. 8.

Because the time constant τ of evaporation cannot be modeled using equations, the time constant τ of evaporation is modeled using a fuzzy neural network at the time constant-of-evaporation estimation unit 22f.

Figure 8:
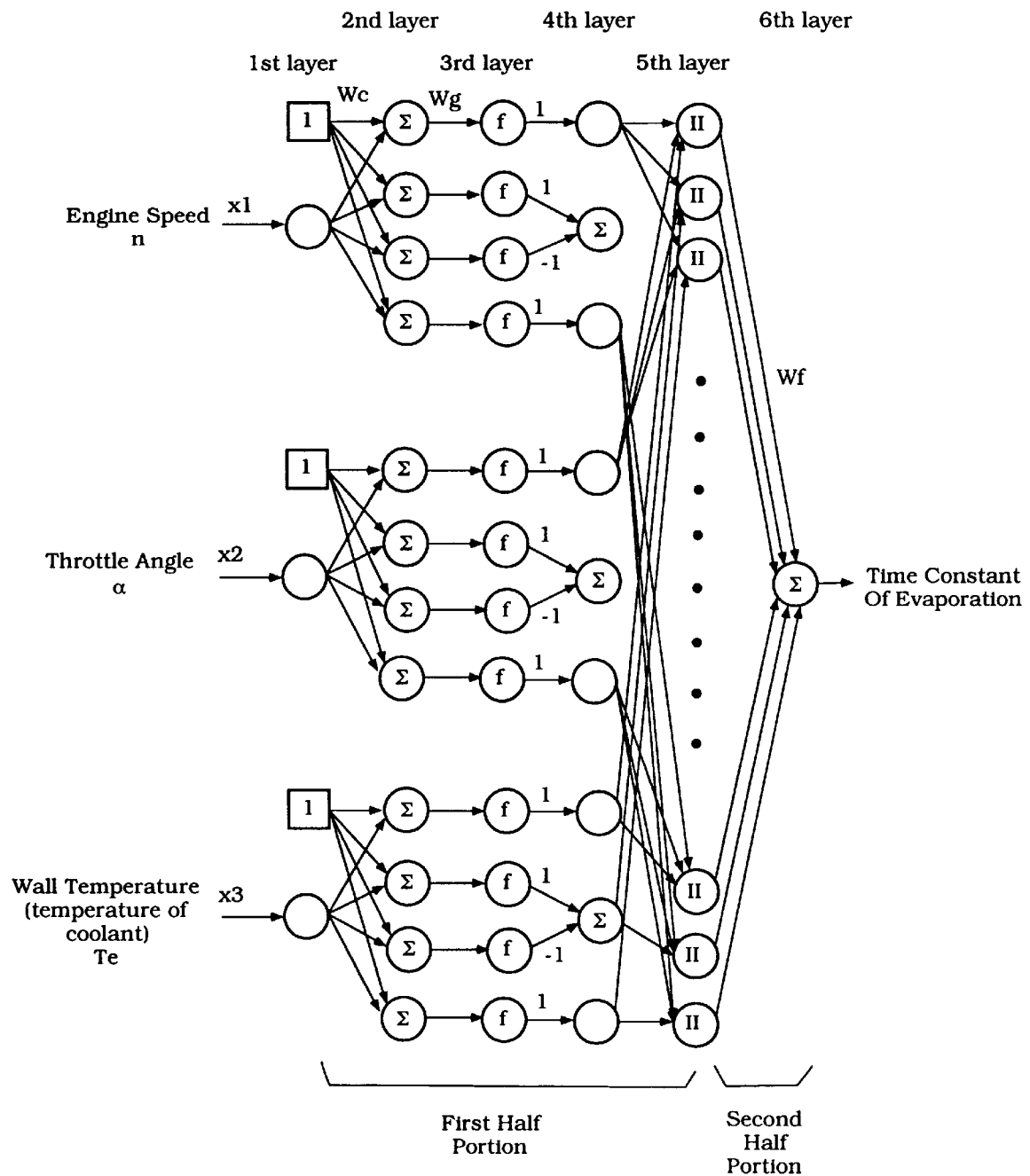
FIG. 8 is a schematic diagram of a fuzzy neural network for determining time constant τ of evaporation, which is used in the time constant-of-evaporation estimation unit illustrated in FIG. 5.

FIG. 8 is a schematic diagram of a fly neural network for determining time constant τ of evaporation. As shown in FIG. 8, this fly neural network comprises a hierarchical fuzzy neural network composed of six layers, wherein layers from a first layer through a fourth layer constitute a first half portion, and layers from a fifth layer to a sixth layer constitute a second half portion. At the first half portion, an engine speed signal n, a throttle angle α, and an intake pipe wall temperature Te, inputted thereinto, are subjected to fuzzy inference processing to determine to what degree they conform to given rules, and at the second half portion, the time constant τ of evaporation is determined based on the outcomes from the first half portion by weighting the outcomes.

In this embodiment, the above rule comprises: three conditions for each input information, i.e., the engine speed, the throttle angle, and the intake pipe temperature; and 27 results corresponding to the conditions.

In the above, the time constant-of-evaporation estimation unit 22f also has a learning function, as with the deposit fuel estimation unit 22e. Using the learning function, in the beginning, the unit undergoes the learning of the fuzzy neural network by correcting each of parameters Wc, Wg, and Wf in such a way that the difference between the experimentally obtained time constant of evaporation and the time constant τ of evaporation outputted from the fuzzy neural network is minimized. Thereafter, teacher data are renovated based on comparison between the actual control value E (F/A) obtained by the oxygen sensor 3 and the target Ep of operation values during a transient state of the engine, after receiving the data. The unit then undergoes the learning of the fuzzy neural network by correcting each of parameters Wc, Wg, and Wf in accordance with the relationship between the time constant τ of evaporation and the operation value E, i.e., "when the time constant τ of evaporation increases, the actual operation value E (F/A) increases". FIG. 12 shows examples illustrating the relationship between the throttle angle and the air-fuel ratio when the fuel deposition rate and the coefficient of evaporation are not correct and when the fuel deposition rate and the coefficient of evaporation are correct due to learning.

Explanation of the processing at the first half and the second half portions of the fuzzy neural network is omitted because the processing is the same as in the fuzzy neural network for determining the fuel deposition rate x.

Air Flow Forward Model

Figure 9:
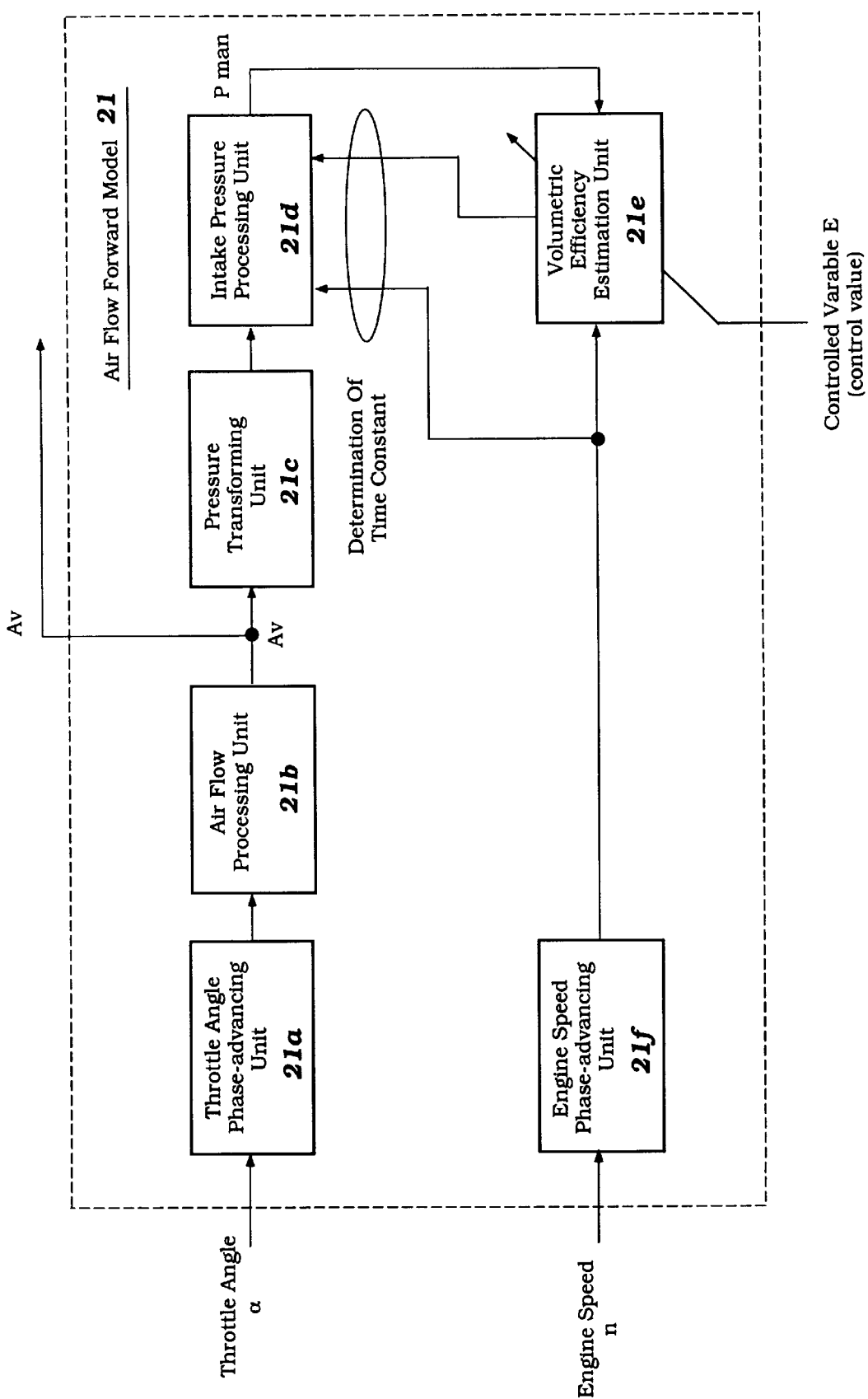
FIG. 9 is a schematic block diagram showing the structures of the air flow forward model illustrated in FIG. 4.
Figure 10:
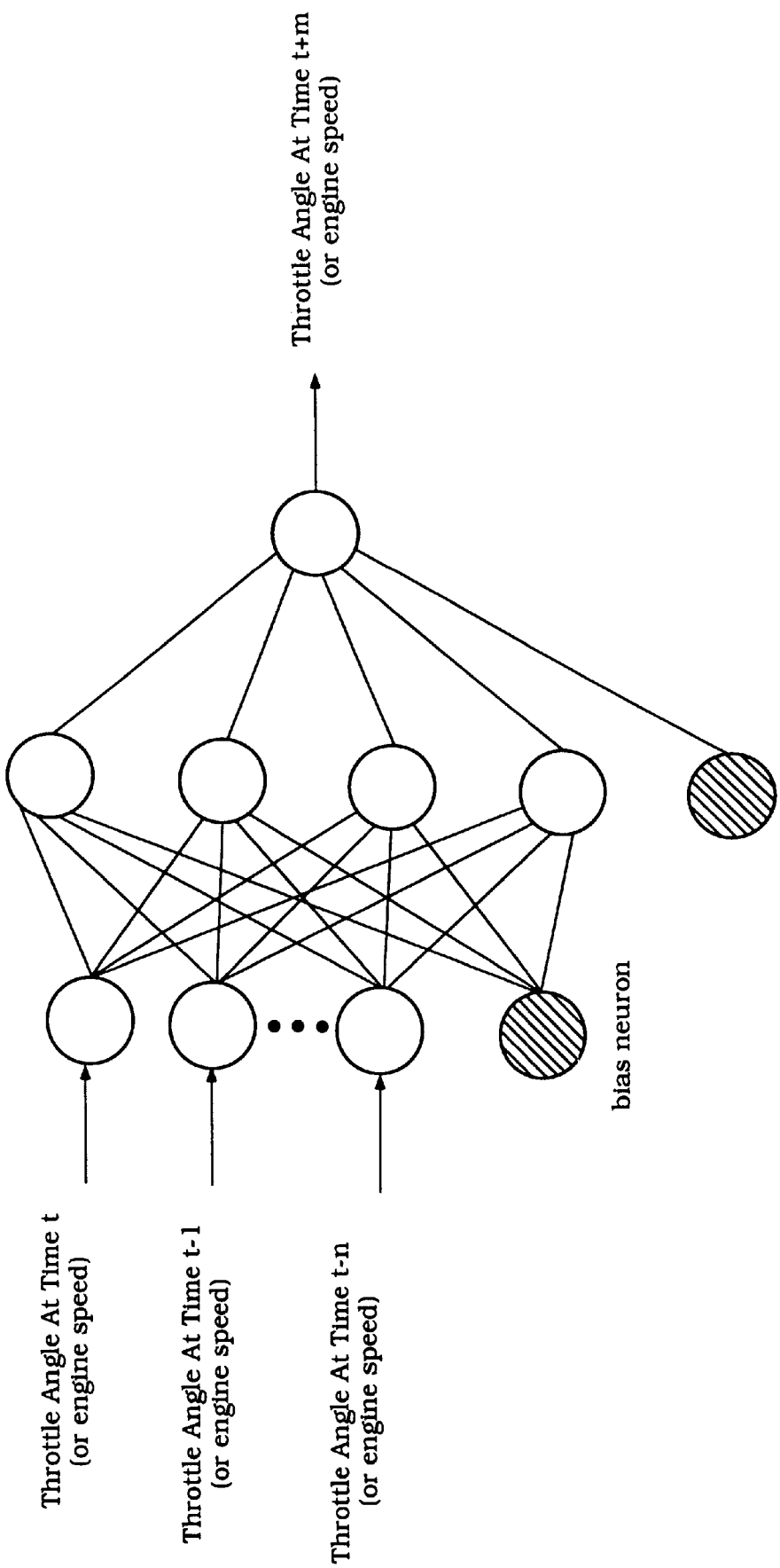
FIG. 10 is a schematic diagram of a neural network used in the phase-advance units illustrated in FIG. 9, to determine a future value of the engine speed or the throttle angle based on the engine speeds or the throttle angles at plural times in the past.

FIG. 9 is a schematic block diagram showing the structures of the air flow forward model 21.

This air flow forward model comprises a phase-advance unit 21a for throttle angle, an air flow processing unit 21b, a pressure transforming unit 21c, an intake pressure processing unit 21d, a volumetric efficiency processing unit 21e, and a phase-advance unit 21f for engine speed.

Phase-Advance Units

At the phase-advance unit 21a for throttle angle and the phase-advance unit 21f for engine speed, the phases of the throttle angle signal α and the engine speed signal n are moved forward to a degree corresponding to the dead time (i.e., the time for the injected fuel to move from the fuel injector 5 to the cylinder 8) which has been eliminated at the fuel deposition forward model 22. That is, each of the phase-advance units 21a and 21f is provided with a neural network which completes learning, changing patterns of the engine speed, or the throttle angle, in relation to time (see FIG. 10). Using this neural network, the phase is advanced by determining a future value of the engine speed and the throttle angle based on the engine speeds and the throttle angles at plural times in the past.

As described above, in the air flow forward model 21, the phases of the throttle angle and the engine speed are advanced to a degree corresponding to the dead time, meaning that the phases of the fuel deposition forward model 22 and the air flow forward model 21 are advanced to a degree corresponding to the dead time, thereby eliminating the discrepancy in the phase between the estimated fuel quantity Fv and the estimated air flow Av, which discrepancy has been created at the fuel deposition forward model 22. Thus, it is possible to estimate an appropriate estimated control value. In addition, for example, when modeling the behavior of injected fuel in an engine which causes no dead time for the injected fuel to move from the fuel injector to the cylinder or causes dead time so short that it can be ignored, such as a type of engine which injects fuel inside the cylinder, it is not necessary to use the phase-lag unit for dead time, i.e., it is not necessary to use the phase-advance units 21a and 21f.

In the above, a method of advancing the phase can be achieved not only by the neural network, but also by a method of least squares.

Because the volumetric efficiency η cannot be modeled using equations, the volumetric efficiency η is modeled using a fuzzy neural network at the volumetric efficiency estimation unit 21e, which network uses the engine speed and the intake pressure as input data.

The air flow Ma and the intake pressure Pman are modeled using fluid mechanics equations (5) and (6).

Air Flow $Ma(\alpha, Pman)=(Ct(\Pi/4)D^2(Pamb\sqrt{k})/(\sqrt{(PTamb)}))\beta_1(\alpha)\beta_2(Pman)+Mao$ (5)

Intake Pressure=$Pman=(-1/\tau)(Pman(RTman/V))Ma(\alpha, Pman)$ (6)

In the above, Ma is an intake air flow, Ct is a flow measured at the throttle, D is the diameter of the throttle, Pamb is the atmospheric pressure, k is the specific heat of air, Tamb is temperature of atmosphere, R is a gas constant, Mao is a compensation, Pman is intake pipe pressure (intake negative pressure), Tman is temperature of intake pipe, V is volume of intake pipe, $\beta_1$ is a coefficient depending on the throttle angle, $\beta_2$ is a coefficient depending on intake pipe pressure.

As being clear from FIG. 9, the air flow forward model 21 needs the throttle angle n and the intake pressure Pman as parameters in order to determine the air volume Ma, and needs the engine speed n, the volumetric efficiency η, and the air volume Ma as parameters in order to determine the intake pressure Pman. Further, the model needs the engine speed n and the intake pressure Pman as parameters in order to the volumetric efficiency η. That is, the air volume Ma, the intake pressure Pman, and the volumetric efficiency η are in a relationship where one requires the others. Thus, only an appropriate value of the intake pressure Pman is set in the beginning and inputted as an initial value, thereby obtaining the air volume Ma at the air flow processing unit 21b, and obtaining the volumetric efficiency η at the volumetric efficiency processing unit 21e. Accordingly, the intake pressure Pman can be obtained at the intake pressure processing unit 21d based on the air volume Ma and the volumetric efficiency η.

Fuzzy Neural Network for Volumetric Efficiency Estimation Unit

Figure 11:
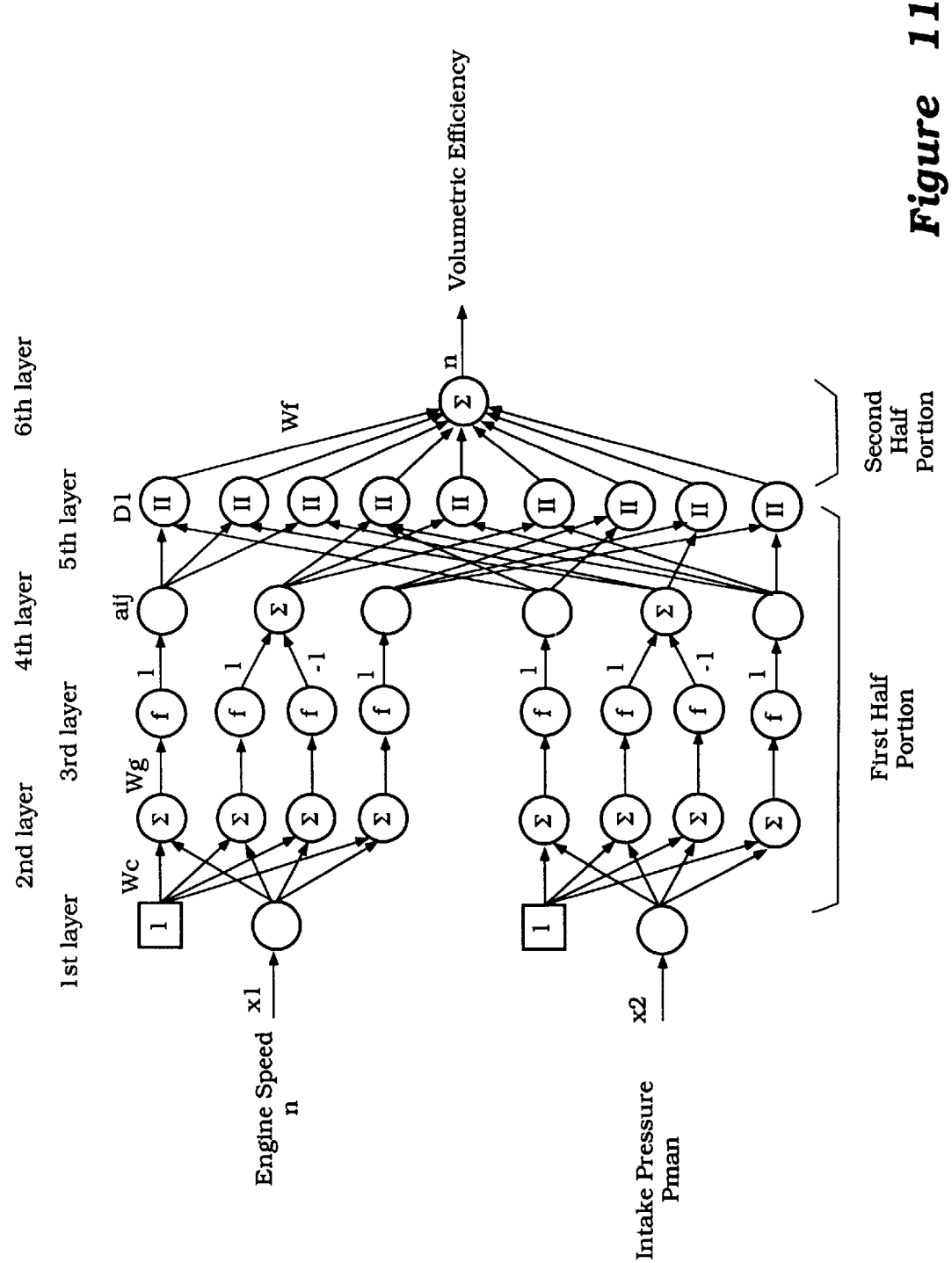
FIG. 11 is a schematic diagram showing a fuzzy neural network used in the volumetric efficiency estimation unit illustrated in FIG. 9, to determine the volumetric efficiency η.

FIG. 11 is a schematic diagram showing a fuzzy neural network for determining the volumetric efficiency η.

As shown in this figure, the fuzzy neural network is for determining the volumetric efficiency η and comprises a hierarchical fuzzy neural network composed of six layers, wherein layers from a first layer through a fourth layer constitute a first half portion, and layers from a fifth layer to a sixth layer constitute a second half portion. At the first half portion, an engine speed signal n and an intake pressure Pman, inputted thereinto, are subjected to fuzzy inference processing to determine to what degree they conform to given rules, and at the second half portion, the volumetric efficiency η is determined based on the outcomes from the first half portion by weighting the outcomes.

In this embodiment, the above rule comprises: three conditions for each input information, i.e., the engine speed and the intake pressure; and 9 results corresponding to the conditions.

In the above, the volumetric efficiency estimation unit 21e has a learning function. Using the learning function, in the beginning, the unit undergoes the learning of the fuzzy neural network by correcting each of parameters Wc, Wg, and Wf in such a way that the difference between the experimentally obtained volumetric efficiency and the volumetric efficiency η outputted from the fuzzy neural network is minimized. Thereafter, teacher data are renovated based on comparison between the actual control value E (F/A) obtained by the oxygen sensor 3 and the target Ep of operation values during a transient state of the engine, after receiving the data. The unit then undergoes the learning of the fuzzy neural network by correcting each of parameters Wc, Wg, and Wf in accordance with the relationship between the volumetric efficiency η and the operation value E, i.e., "when the volumetric efficiency η increases, the actual operation value E (F/A) increases". FIG. 12 shows examples illustrating the relationship between the throttle angle and the air-fuel ratio when the fuel deposition rate and the coefficient of evaporation are not correct and when the fuel deposition rate and the coefficient of evaporation are correct due to learning.

Explanation of the processing at the first half and the second half portions of the fuzzy neural network is omitted because the processing is the same as in the fuzzy neural network for determining the fuel deposition rate x.

Effects Exhibited in The Embodiment

As explained above, the controller 10 of this embodiment has structures wherein the phases of the air flow forward model 21 and the fuel deposition forward model 22, which estimate the air volume Av and the fuel quantity Fv, are advanced to a degree equivalent to the dead time at the model-based controller 20, and wherein the estimated control value Ev, obtained based on the air volume Av and the fuel quantity Fv obtained from the air flow forward model 21 and the fuel deposition forward model 22, is subjected to feedback to obtain the basic operation value Mfn, thereby constituting an inverse model. Using the inverse model, the fuel deposition forward model 22 included in the feedback group that constitutes the inverse model can simply be a first-order lag system, and thus, a large feedback gain can be used in the inverse model. Accordingly, as shown in FIG. 13, as compared with map control, for example, the control system using the inverse model improves, to a great extent, controllability of the air-fuel ratio during a transient state of the engine, and prevents the air-fuel ratio from suddenly changing from the target value to a rich side or a lean side.

Further, the controller 10 of the embodiment is constituted so that the intake pressure Pman is calculated during operation of engine control, using equation models at the air flow forward model 21. Accordingly, unlike an embodiment wherein a negative pressure sensor, for example, is used to measure the intake pressure, filtering treatment can be eliminated, and response characteristics are improved. Further, since control can be conducted in very short cycles and no pressure sensor is required, the structures can be simplified, and the production cost can be reduced.

Further, in the controller 10 of this embodiment, the volumetric efficiency estimation unit 21e, the fuel deposition estimation unit 22e, and the time constant-of-evaporation estimation unit 22f are comprised of fuzzy neural networks. Accordingly, influence on output from parameters Wc, Wg, and Wf is clarified so that learning the influence is easy, and further follow-up learning can easily be conducted.

Further, the controller 10 of this embodiment uses a combination of the model-based control and the feedback control to further compensate for the basic operation value Mfn outputted from the model-based controller 20 in such a way that deviation between the actual control value E and the target value Ep is eliminated, by conducting feedback of the actual control value E at the feedback controller 30. Accordingly, highly accurate air-fuel control can be performed.

Other Features

Although the control systems capable of learning in the model-based controller 20 are the fuzzy neural networks in the aforesaid embodiment, the systems need not be limited thereto, and other neural networks or CMAC (Cerebellar Model Arithmetic Computer), for example, can be used as long as the control systems are capable of learning.

Although engine control over the air-fuel ratio of the engine 1 provided with the fuel injector 5 in the intake pipe 4 has been explained in the aforesaid embodiment, the type of engine is not limited thereto, and various types of engines such as a type of engine which injects fuel inside the cylinder can be employed.

Although control over the air-fuel ratio of the engine 1 has been explained in the aforesaid embodiment, the control value is not limited thereto, and the ignition timing or the valve timing, for example, can be used as a control value.

Various Aspects of the Invention

As described above, the present invention includes various aspects as follows:

1) An engine control system comprising the steps of: constructing a forward model of an engine in a control system; constructing an inverse model by constructing a first feedback loop that performs a feedback for a controlled variable of the forward model and obtains an engine-actuating value based on the controlled variable; and controlling the engine by utilizing at least the engine-actuating value obtained from the inverse model.

2) An engine control system of item 1, wherein the control system has learning function.

3) An engine control system of item 1, wherein the control system having learning function is at least one of a fuzzy neural circuit network, neural circuit network, or CMAC.

4) An engine control system of items 2 or 3, wherein the control system having learning function performs learning by using teacher data based on results of comparison between the controlled variable obtained from the engine and target controlled variable.

5) An engine control system of items 2 or 3, wherein the control system having learning function performs learning by using teacher data based on results of comparison between a physical coefficient (e.g., volumetric efficiency, fuel deposition rate, and time constant of evaporation) different from output of the control system (e.g., the air-fuel ratio) and target physical coefficient.

6) An engine control system of items 4 or 5, wherein an initial value of the teacher data is predetermined.

7) An engine control system of items 1, 2, 3, 4, 5, or 6, wherein the controlled variable is the air-fuel ratio of the engine, the actuating value is the fuel injection quantity, and the forward model comprises a forward model based on volumetric efficiency of the engine and a forward model based on fuel behavior inside an intake pipe.

8) An engine control system of item 7, wherein the forward model based on fuel behavior comprises at least one of the fuel deposition rate of the injected fuel deposited on a given wall of the intake pipe, or the time constant of evaporation of the deposited fuel.

9) An engine control system of items 7 or 8, further comprising steps of: learning the forward model based on volumetric efficiency by using the difference between the target air-fuel ratio and the actual fuel ratio outputted from the engine when in a stable state; and learning the forward model based on fuel behavior by using the difference between the target air-fuel ratio and the actual fuel ratio outputted from the engine when in a transient state.

10) An engine control system of items 7, 8, or 9, wherein input information inputted to the forward model based on volumetric efficiency comprises intake pressure, and output information outputted therefrom comprises volumetric efficiency.

11) An engine control system of items 7, 8, 9, or 10, wherein input information inputted to the forward model based on the fuel deposition rate comprises at least one of the engine speed or the throttle angle, and output information outputted therefrom is the fuel deposition rate.

12) An engine control system of items 8, 9, 10, or 11, wherein input information inputted to the forward model based on the time constant of evaporation comprises at least one of the engine speed, throttle angle, intake pipe wall temperature, or coolant temperature, and output information outputted therefrom is the time constant of evaporation.

13) An engine control system of items 8, 9, 10, 11, or 12, wherein the forward model based on volumetric efficiency comprises a formulation model, and receives a predetermined intake pressure as input information, and, after the engine starts, receives intake pressure obtained by the formulation model as input information.

14) An engine control system of any one of items 1 through 13, wherein the forward model is constructed so as to be a first-order lag system or a first-order lag/dead time system in the first feedback loop, and if the forward model is constructed to be the first-order lag/dead time system, the system is constituted by advancing a phase to a degree corresponding to the dead time of the entire forward model.

15) An engine control system of any one of items 1 through 14, further comprising step of: constructing a second feedback loop that performs a feedback of the controlled variable outputted from the engine, for determining a compensation value for the actuating value outputted from the inverse model by comparing the controlled variable and the target controlled variable.

16) An engine control system of any one of items 1 through 15, further comprising the step of delaying the phase of the target controlled variable to be inputted into the second feedback loop, to a degree corresponding to the dead time of the first feedback loop.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. An engine control system for controlling performance of an engine which is operable by an actuating parameter and the performance of which is indictable by a controlled variable, said control system comprising an inverse model unit having input and output sides for outputting an actuating parameter when receiving a controlled variable, wherein the input-output relationship of the inverse model unit is the inverse of that of the engine, said inverse model unit comprising:

a forward model unit having input and output sides, said forward model unit being a simulation of the engine and outputting an estimated controlled variable when receiving an actuating parameter under current running conditions of the engine, said forward model unit receiving at least one condition-indicating signal detected from the engine, said at least one condition-indicating signal indicating the current running conditions of the engine;

a feedback control unit having input and output sides for outputting an actuating parameter when receiving and comparing a target value inputted into the inverse model unit and the estimated controlled variable from said forward model unit, the output side of said feedback control unit being connected to the input side of said forward model unit; and an output circuit for outputting the actuating parameter, which is outputted from said feedback control unit to said forward model unit, from said inverse model unit for controlling the engine; wherein the inverse model unit receives the target value of the controlled variable and outputs the actuating parameter for controlling the engine.

2. An engine control system according to claim 1, wherein said forward model unit has learning function.

3. An engine control system according to claim 2, wherein said learning function is at least one selected from the group consisting of a fussy neural circuit network, a neural circuit network, and a cerebellar model arithmetic computer (CMAC).

4. An engine control system according to claim 2, further comprising a circuit for feeding a controlled variable outputted from the engine, to said forward model unit, wherein said forward model unit receives at least one condition-indicating signal and the controlled variable outputted from the engine.

5. An engine control system according to claim 4, wherein said target value is of a controlled variable, and said learning function uses teacher data formed by comparing the target value and the controlled variable outputted from the engine.

6. An engine control system according to claim 5, wherein the target value and said controlled variable outputted from the engine are the air-fuel ratio in an exhaust system of the engine.

7. An engine control system according to claim 4, wherein said target value is of a physical coefficient other than the controlled variable outputted from said forward model unit, and said learning function uses teacher data formed by comparing the target value and a physical coefficient outputted from the engine.

8. An engine control system according to claim 7, wherein said physical coefficient is at least one selected from the group consisting of volumetric efficiency of the engine, fuel deposition rate and time constant of evaporation in an intake system of the engine.

9. An engine control system according to claim 4, wherein said at least one condition-indicating signal is at least one selected from the group consisting of engine speed, throttle angle, intake pipe wall temperature, or engine cooling water temperature.

10. An engine control system according to claim 4, wherein the controlled variable outputted from the engine is the air-fuel ratio in an exhaust system of the engine, and the actuating parameter is the fuel injection quantity in an intake system of the engine.

11. An engine control system according to claim 10, wherein said forward model unit comprises: an air flow forward model unit for outputting an estimated air flow when receiving at least one condition-indicating signal; a fuel deposition forward model unit for outputting an estimated fuel deposit quantity when receiving at least one condition-indicating signal; and a processing unit for calculating an estimated air-fuel ratio, as the controlled variable, from the estimated air flow and the estimated fuel deposit quantity.

12. An engine control system according to claim 11, wherein said air flow forward model unit is constituted by modelling a relationship between the at least one condition-indicating signal and the estimated air flow, using volumetric efficiency of the engine as an element.

13. An engine control system according to claim 11, wherein said fuel deposition forward model unit is constituted by modelling a relationship between the condition-indicating signal and the estimated fuel deposit quantity, using at least one of a quantity of fuel deposited in the intake system or a time constant of evaporation of the deposited fuel as an element.

14. An engine control system according to claim 12, wherein said air flow forward model undergoes learning a model for the volumetric efficiency during a stable state of the engine, by using the difference between the target value and the controlled variable outputted from the engine, both being the air-fuel ratio.

15. An engine control system according to claim 13, wherein said fuel deposition forward model undergoes learning a model for the at least one of a quantity of fuel deposited in the intake system or a time constant of evaporation of the deposited fuel during a transient state of the engine, by using the difference between the target value and the controlled variable outputted from the engine, both being the air-fuel ratio.

16. An engine control system according to claim 4, further comprising a second feedback control unit for outputting a compensation for the actuating parameter from said inverse model unit when receiving and comparing the target value and the controlled variable outputted from the engine.

17. An engine control system according to claim 16, further comprising a phase-lag unit for causing a phase-lag in the target value before being inputted into said second feedback control unit, to coincide the phase of the actuating parameter from said inverse model unit and the phase of the compensation from said second feedback control unit.

* * * * *